(12) United States Patent
Chung et al.

(10) Patent No.: US 6,730,343 B2
(45) Date of Patent: May 4, 2004

(54) SINGLE STRENGTH JUICE DEACIDIFICATION INCORPORATING JUICE DOME

(76) Inventors: Yongsoo Chung, 7151 Spikerush Ct., Bradenton, FL (US) 34202; Osvaldo A. Chu, 4880 Sabal Lake Cir., Sarasota, FL (US) 34238; D. Scott Lineback, 12522 Rockrose Glen, Bradenton, FL (US) 34202; Mark A. Pepper, 11127 Hyacinth Pl., Bradenton, FL (US) 34202; Marcelo Perez Alvarez, P.O. Box 15092, Bradenton, FL (US) 34280

( * ) Notice: Subject to any disclaimer, the term of this patent is extended or adjusted under 35 U.S.C. 154(b) by 242 days.

(21) Appl. No.: 09/967,041

(22) Filed: Sep. 28, 2001

(65) Prior Publication Data

US 2003/0064139 A1 Apr. 3, 2003

(51) Int. Cl.[7] .................................................. A23L 2/78
(52) U.S. Cl. ....................................... 426/271; 426/599
(58) Field of Search .................................. 426/271, 599

(56) References Cited

U.S. PATENT DOCUMENTS

| | | |
|---|---|---|
| 2,483,634 A | 10/1949 | Graham, Jr. |
| 3,759,999 A | 9/1973 | Herwig et al. |
| 3,801,717 A | 4/1974 | Huffman |
| 3,973,986 A | 8/1976 | Schoenrock et al. |
| 4,205,092 A | 5/1980 | Mattick et al. |
| 4,380,552 A | 4/1983 | Gestrelius et al. |
| 4,439,458 A | 3/1984 | Puri |
| 4,522,836 A | 6/1985 | Dechow et al. |
| 4,643,902 A | 2/1987 | Lawhon et al. |
| 4,666,721 A | 5/1987 | Norman et al. |
| 4,775,541 A | 10/1988 | Brown et al. |
| 4,965,083 A | 10/1990 | Norman et al. |
| 5,057,197 A | 10/1991 | Perry et al. |
| 5,252,350 A | 10/1993 | Hartmann |
| 5,817,354 A | 10/1998 | Mozaffar et al. |
| 5,885,638 A | 3/1999 | Takayanagi et al. |
| 6,045,842 A | 4/2000 | Mozaffar et al. |
| 6,113,791 A | 9/2000 | Hartmann |
| 6,210,576 B1 | 4/2001 | Rosa |
| 6,248,382 B1 | 6/2001 | Miller et al. |

FOREIGN PATENT DOCUMENTS

EP 0 415 905 3/1991

OTHER PUBLICATIONS

R. Lyndon, *Commercialisation of Adsorbertechnology in the Fruit Juice Industry*, Fruit Processing, 1996.

Steven Nagy and John A. Attaway, *Citrus Nutrition and Quality*, pp. 226–271, Based on a symposium sponsored by the Division of Agricultural and Food Chemistry at the 179th Meeting of the American Chemical Society, Houston, Texas, Mar. 26, 1980.

PCT International Search Report.

*Primary Examiner*—Helen Pratt

(57) ABSTRACT

A process for deacidifying single strength juice, including not from concentrate (NFC) juice, uses an ion-exchange column. The process includes flowing water into the resin column and draining a fraction of the water from the column to create a head space in the column above the resin beads. Single strength juice is then introduced into the head space and into the resin column. Water is drained from the column until an SOI criterium is met. Single strength juice continues to be introduced into the resin column and treated liquid is directed to the production of deacidified single strength juice, typically until such time as the acidity of the treated liquid exceeds a pre-determined value. Treated single strength juice is removed from the resin column to create a head space in the column. Water then is introduced into the head space and liquid passes through the exit port.

30 Claims, 4 Drawing Sheets

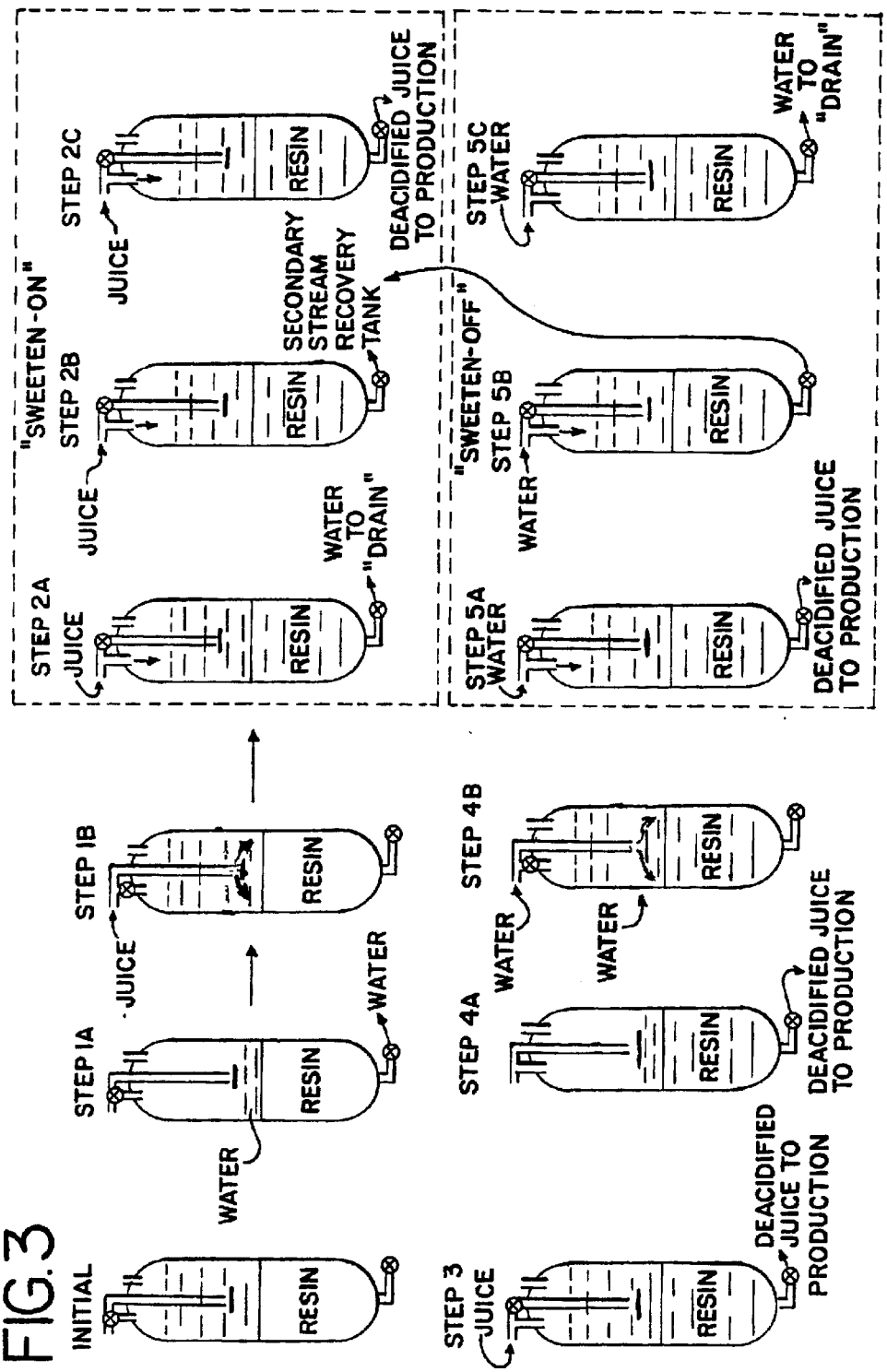

PH PROFILE OF BLENDED JUICES AT DIFFERENT BED VOLUMES

PH PROFILE OF BLENDED JUICES AT DIFFERENT BED VOLUMES

SINGLE STRENGTH JUICE DEACIDIFICATION INCORPORATING JUICE DOME

BACKGROUND OF THE INVENTION

The present invention relates to a process and system for processing fruit juice and to a juice deacidification process and system utilizing ion exchange resin columns that minimizes the amount of juice lost during the "sweeten-on/sweeten-off" ion exchange steps.

Juice products are highly popular with consumers due to both their taste and their nutritional value. However, some fruit juices, such as those from citrus fruits, can have a level of acidity that makes them disagreeable to persons with sensitive stomachs.

Numerous individuals have been known to experience negative effects upon ingesting different foods. A true food allergy occurs when the immune system of the individual overreacts to certain proteins in food. It is believed that hundreds of food ingredients can provoke an allergic reaction. Typical foods in this regard are nuts, peanuts, milk, eggs, fish, shellfish, soybeans and wheat. Foods such as these can lead to symptoms including nausea, hives, skin rash, nasal congestion, wheezing, and the like. However, most unpleasant reactions to food are caused not by allergies but by intolerances, which tend to be less severe than true food allergies. Typical in this regard are lactose intolerance, sulfite intolerance and intolerance to monosodium glutamate, red wine, chocolate and food coloring agents. Another intolerance of some frequency is manifested by gastral distress and/or digestive difficulties which certain individuals experience shortly after ingesting orange juice products.

In some circles, it is generally assumed that the relatively high acidity of orange juice products is a primary contributor to these negative or unpleasant experiences with orange juice products for a small percentage of the population. For example, Kligerman et al U.S. Pat. No. 5,665,415 and U.S. Pat. No. 5,869,119, incorporated hereinto by reference, suggest that acidic foods or beverages such as coffee and other beverages can be combined with calcium glycerophosphate so as to raise the pH of the food or beverage by at least 0.5 pH units, such as to a pH of greater than 5.4, which typically is pH higher than desirable for superior tasting orange juice. This pH adjustment is said to reduce the tendency of the food or beverage to cause heartburn and other esophageal and/or gastrointestinal distress. This approach generally follows the conventional wisdom that ingesting antacids treats heartburn by helping to neutralize stomach acid. This approach suggests, in general, raising the pH of the food or beverage to well above 5.

Processes for deacidifying citrus juice have been known since the 1960s, and commercially-viable deacidification processes using anionic ion exchange for acid reduction of citrus fruit juices were known by 1980. However, such processing was used for deacidifying juice made from concentrate, which has a standard of identity (SOI) that permits a great range of flexibility in the processing steps with respect to the dilution and blending of the juice product.

Since that time, "not from concentrate" or NFC juices have become very popular with consumers because of their "fresh-squeezed" taste. These NFC juices must meet their own SOI criteria. Among these criteria is the avoidance of a final juice product which has water added characteristics. Other criteria typically include brix minimums and brix-to-acid ratio minimums.

For example the US Food and Drug Administration sets a standard for juices such as orange juice, including brix minimums. In this regard 21 CFR Section 146.140, incorporated by reference hereinto, states that finished pasteurized orange juice is to contain not less than 10.5 percent by weight of orange juice soluble solids, exclusive of the solids of any added sweetening ingredients. This FDA regulation further states that the ratio of brix to grams of citric acid per 100 ml of juice is not less than 10 to 1. The juice industry recognizes these criteria for pasteurized orange juice or single strength orange juice as applying to NFC orange juice. It will be understood that these SOI criteria are used herein with respect to NFC orange juice or pasteurized single strength orange juice. This same concept of SOI criteria applies as well to other pasteurized single strength juices.

While it is anticipated that there would be a significant market for a low acid NFC orange juice, deacidification processes utilizing ion-exchange resin columns can easily result in the processed juice being diluted. This is particularly true if the ion-exchange column is designed to operate with a water/juice interface or a "water dome" in the head space of the column above the resin bed. Such water dilution of the processed juice is unacceptable for NFC juices because the standard of identity ("SOI") of the juice is compromised.

Accordingly, it is an object of the present invention to provide a process and system for deacidifying NFC juices that do not compromise the standard of identity required for such juice products.

More particularly, it is an object of the present invention to provide a process and system for deacidifying NFC juices that do not dilute the NFC juice so that NFC SOI can be maintained.

It is a still further object to deacidify NFC juices while minimizing the amount of juice that is wasted or becomes otherwise unuseable due to the deacidification process.

A further object of the invention is to provide an improved single strength juice which meets SOI criteria throughout all phases of single strength juice product collection.

SUMMARY OF THE INVENTION

These objects, as well as others that will become apparent upon reference to the following detailed description and accompanying drawings, are accomplished by a process for deacidifying single strength juice, preferably not from concentrate (NFC) juice that uses an ion-exchange column having a lower volume portion that is filled with acid-absorbing resin beads and an upper volume portion within which the resin beads are not present. The lower volume portion has an exit port, while at least one inlet port opens into the upper volume portion.

The process includes filling the resin column with water and then draining a fraction of the water from the column through the exit port to create a head space in the column above the resin beads. Untreated juice is then introduced into the resin column. In a preferred arrangement, such initial flow is through an inlet port so as to minimize resin bed disturbance. With this arrangement, after the head space has an adequate volume of juice, untreated juice can be introduced into the resin column. In the illustrated embodiment, this is through an inlet port which is at an upper location of the upper volume portion. Water is drained through the exit port until the outflowing treated liquid meets SOI criteria for the single strength juice. Untreated juice continues to be introduced, and treated juice is collected as deacidified single strength juice until a predetermined value is attained, such as when a target processing volume is obtained or until the resin is exhausted.

Treated juice is removed from the resin column to then create a head space in the column. In one approach, this leaves the resin beads wetted or even submerged. Alternatively, all free juice may be displaced out of the resin bed before the next phase introduces water into the resin bed. Water is then introduced into the head space in the column, and liquid passes through the exit port until the outflowing liquid does not meet SOI criteria for the single strength juice, at which time this liquid is no longer directed to production.

BRIEF DESCRIPTION OF THE DRAWINGS

FIG. 3 illustrates the deacidification process of the present invention with a single ion-exchange resin column (it being understood that the other resin column of the pair that is not shown is being regenerated simultaneously with the deacidification being carried out in the first resin column).

DETAILED DESCRIPTION OF PREFERRED EMBODIMENTS

Figure 1:
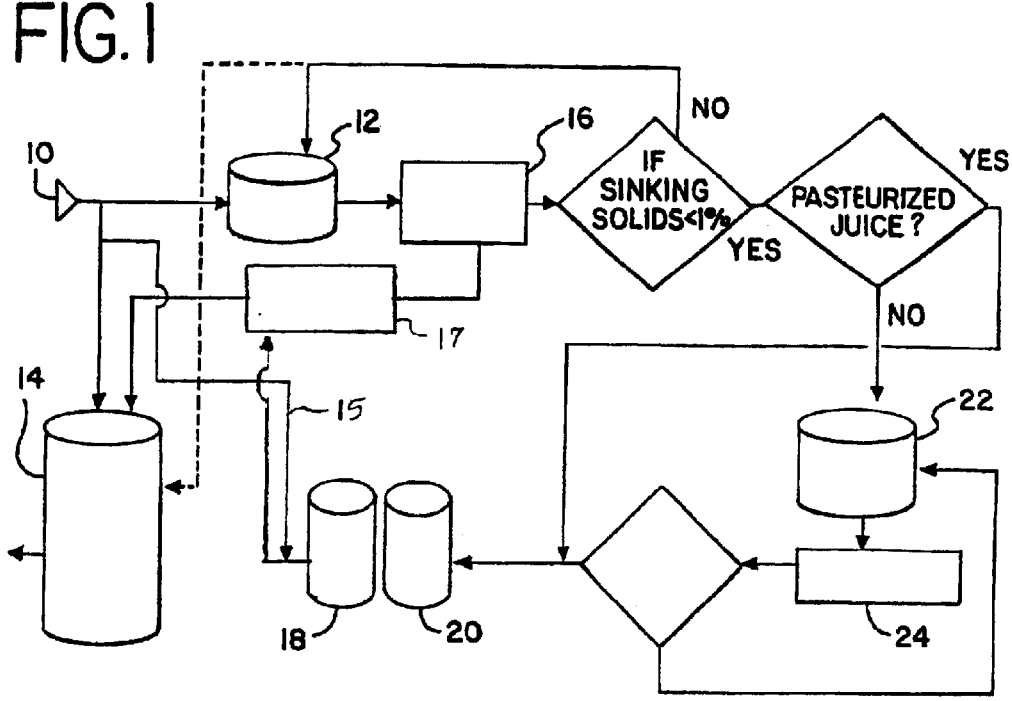
FIG. 1 is a schematic diagram illustrating a process for producing single strength low acid juice products incorporating ion-exchange resin columns in accordance with the present invention.

The method of the present invention is directed to the deacidification of single strength fruit or vegetable juice, especially NFC citrus juice, and is part of the process of producing a low-acid single strength juice product from standard single strength juice.

Deacidification of citrus juice may take place in any number of known devices. For example, the form of ion exchange resin equipment used in deacidification of citrus juice may be a flow-through column and/or a continuous system or semi-continuous system. Another possibility is the use of resins in a bed formation, such as in an overall batch approach. Ion exchange technology may be utilized to deacidify juice in any number of possible devices, provided that the resins are allowed to contact the juice during the process.

The resins used in ion exchange technology may likewise be of a wide variety. Resins of any level of binding affinity may be used, depending on the acidity of the juice. In one preferred embodiment, the resin used is a weakly-basic, anionic exchange resin, often a polystyrene copolymer which contains a tertiary amine group as a functional group. This weakly-basic resin is preferred because of its ability to pull organic acids such as citric acid from the juice, thereby producing a deacidified juice stream.

Examples of other commercial resin systems include those incorporating ion exchange resins such as anionic polystyrene copolymers which release chloride groups and basic anionic polystyrene resins having quaternary ammonium active groups. Specifically, resins such as Amberlite IRA-67, Amberlite IRA-95, Dowex 67, Dowex 77 and Diaion WA 30 may be used.

Deacidification of juice takes place as a juice stream is passed through or otherwise contacts the resin bed. The juice used may be any fruit or vegetable single strength juice which has not been concentrated, preferably an NFC citrus juice, including orange and grapefruit, the most preferred juice being orange juice. To deacidify the citrus juice using ion exchange technology, a juice stream comes in contact with the ion exchange resins. The preferred method uses a juice stream that is passed through the resin structure, such as the resin bed or column. As the juice contacts the resins, ion exchange takes place in accordance with known principles.

In ion exchange deacidification, when the juice stream comes in contact with the resin, the ions of the juice are exchanged with those of the resin. In the preferred embodiment, acidic juice comes in contact with, and is attracted to, the weakly-basic polystyrene resin. When citrus juice is treated, the ion exchange resin adsorbs the citrus ions of the citrus juice. Adsorption is the accumulation of ions on a resin pore surface, resulting in a relatively high concentration of the ions at the resin's surface. After citrate ions of the juice stream are adsorbed by the resin, the stream is substantially less acidic.

The general process for producing a low-acid single strength juice product such as low-acid NFC orange juice typically includes the following steps: (a) heat treatment, if needed, to inactivate the pectin esterase enzyme present in the single strength juice; (b) centrifugation for solid/liquid separation to produce a solids-reduced juice (i.e., juice with generally less than 3 volume percent, typically less than 2 volume percent, and, preferably, not more than 1 volume percent, of suspended solids); (c) deacidification of the solids-reduced juice, with untreated juice optionally being added to the deacidified juice immediately after the deacidifying process to adjust the pH to a level (i.e., below about 4.5) that is unfavorable to microbial activity; (d) blending the deacidified solids-reduced juice with the solids that were separated in step (b) and additional untreated juice to the extent necessary to obtain the desired final acidity level; (e) adding additional ingredients such as oils, minerals and vitamins, as desired; (f) mixing for a final time; and (g) packaging. Pasteurization and the performance of quality control checks typically will be carried out at suitable stages of the process. With respect to step (b), other solid/liquid separation techniques, such as membrane filtration, decanting or the use of rotary filters or finishers, and the like may be used in place of centrifugation.

The general overall process may be run at various temperatures. However, it is preferred that the overall process be performed at refrigerated temperatures (i.e., less than about 45° F. and preferably between about 35° F. and 45° F.) to produce a higher quality juice product. It has been determined that the quality of the resulting juice product is greatly enhanced by conducting the process at these low temperature levels, even though this would be expected to reduce the efficiency of the solid/liquid separation of step (b) and the ion exchange efficiency of the resin of step (c). It has been found that very satisfactory results and minimal negative operational aspects have been experienced.

A schematic diagram illustrating steps (b) through (f) of the process of producing a low-acid single strength juice product is shown in FIG. 1, as well as the system by which it is carried out. In this illustration, single strength orange juice (usually pasteurized) enters the system at 10 and flows into a centrifuge feed tank 12. Simultaneously, a portion of the single strength juice also is directed into a blend tank 14 for later combination with the deacidified juice. Optionally, a portion of the untreated juice may be diverted to a bypass line 15 so that it can be added back to the treated juice immediately after deacidification, the importance of which is discussed below.

From the centrifuge feed tank 12 the juice flows into one or more centrifuges 16 for separation of the solids from the juice. The separated solids (and a small quantity of juice) are diverted directly to the blend tank 14, or as illustrated into a recombine tank 17, while the remainder is tested to determine whether sufficient separation has been accomplished.

This testing provides a volume percent value, based upon the total volume of the juice, measured by the method described by D. Kimball in "Citrus Processing Quality Control and Technology," 1991, incorporated by reference hereinto. This measurement procedure is summarized generally as follows for orange juice. 11.8° brix juice at 26° C. is poured into a 50 ml centrifuge tube, which is inserted into a centrifuge. For a centrifuge with a spacing of 11.5 inches, the centrifuge is run at 1500 rpm for 10 minutes. The pulp level is read, and the value is divided by 50 ml to determine the volume percent.

In the illustrated embodiment, the thus deterrminied suspended solids in the centrifuged juice is selected to be not greater than 1 volume percent. Acceptable results can also be obtained for suspended solids of up to about 3 volume percent if the average particle size distribution is 10 microns or less. Usually, the suspended solids will be less than about 2 volume percent of the total volume of the centrifuged juice. The quantity of suspended solids is limited by the ability of the reduced-solids juice to easily pass through the resin column. If the desired suspended solids volume is not attained, the solids-reduced juice is returned to the feed tank 12 for further centrifugation or other separation, or same can be transferred to the blend tank 14 as desired.

If the suspended solids are at or below the selected maximum volume percent, the juice then is treated or otherwise processed to inactivate or remove enzyme, for example by heat treatment. This also can be used to pasteurize, if needed. If the juice has been previously thus treated or pasteurized, it goes directly from the centrifuge 16 to the ion exchange resin columns 18, 20 for deacidification in accordance with the present invention. If not, the juice is directed from the centrifuge 16 to a balance tank 22. It is then rapidly heated at 24, and then chilled, before being directed to the resin columns 18, 20.

As illustrated, the process and system utilize a pair of identical ion-exchange resin columns 18, 20. This permits continuous operation of the system, as one column of the pair can be recharged (typically with a basic medium such as but not limited to sodium hydroxide—NaOH, or potassium hydroxide—KOH, or a combination of bases such as these), while the other resin column in the pair is being used to deacidify the juice.

Figure 2:
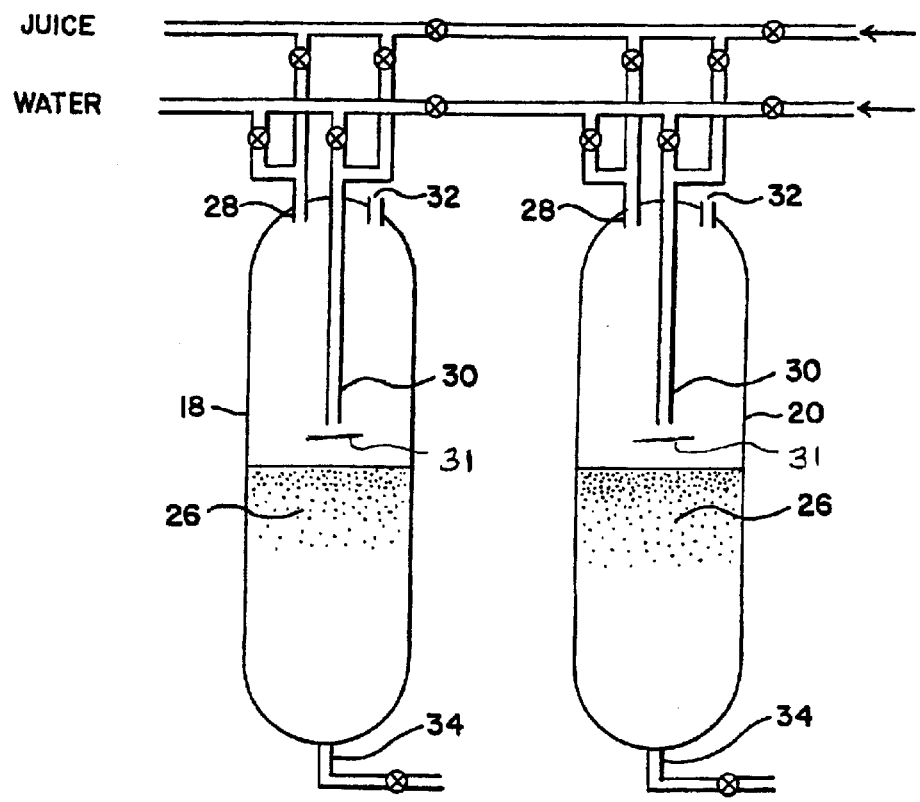
FIG. 2 is an enlarged schematic view of a pair of ion-exchange resin columns for performing the process of the present invention.

With reference to FIG. 2, each resin column 18, 20 is partially filled (approximately half-filling being shown) with ion exchange resin beads 26. The composition of such beads is well-known. See, for example, U.S. Pat. Nos. 4,522,836 and 4,666,721 which are incorporated hereinto by reference. Through a series of piping and flow control valves well known in the art, the resin columns 18, 20 are configured to selectively admit either juice or water.

In this illustrated embodiment, such inflow can be through one of two inlet ports. Inlet port 28 is configured so that the fluid flowing therethrough enters at the top of the resin column, approximately half the column height above the top of the bed of resin beads 26. Inlet port 30 is a "downcomer", i.e., it is configured so that fluid flowing through it enters the resin column only a short distance above the bed of resin beads 26.

The illustrated downcomer has a member between its outlet(s) and the resin bed surface so that the outflow cascades and enters the resin bed in a diffused manner so as to minimize the disturbance of the resin beads by fluid flowing out of inlet 30. To this end, the opening in the inlet 30 is illustrated to be spaced above a deflector plate 31. The spacing should be adequate to allow for a 25 percent to 30 percent expansion of the resin beads during the course of the process. After such expansion, the bed surface remains spaced from the port 30 or plate 31, preferably by from about 2 to 4 inches.

The top of each resin column includes an air vent 32, as is customary. Also customary is an exit port 34 (and valve) at the bottom of each column, thus permitting fluid contained in the column to be drained by gravity, or by pressure application, in a known manner. Typically when pressure is applied, it is by air or other gas.

In keeping with the invention, a deacidification process and system are provided that utilize a "juice dome" in the resin column to insure adherence to SOI requirements for the NFC juice and to minimize yield loss during processing.

With reference to FIG. 3, the "juice dome" deacidification process is illustrated. Only a single resin column is illustrated, it being understood that the other resin column of the pair is being recharged and is, thus, off-line. Any number of resin columns can be provided to satisfy flow requirements. In its INITIAL condition, the illustrated resin column is freshly recharged and filled with water, so that the portion of the resin column above the level of the resin beads (i.e., the "dome" of the column) is substantially filled with water. This illustrates the "charged" phase.

The dome then is transitioned from being filled with water to being filled with juice. Thus, as shown in STEP 1A, water is drained from the column to create a head space in the dome. This may be accomplished by either the force of gravity or by the application of air pressure to the top of the column. During this phase of transition from the charged phase to a "sweeten-on" phase, preferably only a portion of the water is drained from the column, so that the resin beads remain wetted, whether completely submerged or not. Keeping the resin beads wetted helps to insure that the beads do not dry out, which can result in the empty spaces in the beads filling with air. Such captured air cannot be easily displaced, thus reducing the surface area of the beads available for deacidification, and reducing the efficiency of the process.

Then, as shown in STEP 1B, the single strength juice flows into the dome, or head space. The flow continues until a desired volume of juice is positioned within the dome, for example until the upper volume portion is filled. Preferably, this flow introduces the single strength juice from the middle-level or downcomer inlet port 30, while air is vented through the top of the column. In this step, when the dome is to be filled completely with juice, the flow of juice to the column is stopped once the upper volume portion is full. This is the "juice dome" formation stage.

The next steps constitute a transition to the production stage of the deacidification process. This is known as the "sweeten-on" phase of the deacidification process and system, and is shown as STEP 2A, STEP 2B, and STEP 2C. First, as shown in STEP 2A, water is pushed out of the resin bed by introducing single strength juice into the column, preferably through the top inlet port 28. The water is drained from the column.

At a selected point, the outflow need no longer be drained as waste, but it can be collected for recovery of juice components as the juice content increases. As can be appreciated, the "interface" is a mixture of water and juice or diluted juice. When this outflows, it can be collected for uses other than as single strength or NFC juice. This outflow can be monitored by tracking parameters such as brix and/or color. Generally, at least one SOI criteria parameter, and if possible multiple parameters, will be tracked. Also, this can be determined by tracking time of flow at a known flow-rate. As shown in illustrative STEP 2B, the diluted juice stream is diverted to a secondary stream recovery tank and can later be used in other products which are not restricted by the SOI requirements for the single strength juice.

Then, when it is determined that the deacidified juice exiting the column meets SOI criteria of the single strength juice, product can be collected as deacidified single strength or NFC juice. This is generally shown in STEP 2C. With the invention, this is accomplished after a turn over of as little as one resin Bed Volume. This is the volume of the beads within the vessel. Somewhat greater than one Bed Volume can be displaced before diverting the outflow to production, such as after about 1½ Bed Volumes, to provide a measure of safely to assure that only juice meeting SOI criteria is collected as single strength or NFC product.

Juice continues to be introduced into the column such as through the top inlet port 28, and the deacidified juice continues to be directed to production, as shown in STEP 3. This production phase continues until production is stopped according to program. This may be at a point when the acidity of the deacidified juice has increased to a certain predetermined value, meaning that the resin beads are "spent" and that the resin column needs to be regenerated.

A further transition phase transforms the resin column from the spent state to the "sweeten-off" phase. The dome of the column is transitioned from containing juice to containing water, as shown in STEP 4A and STEP 4B. First, as shown in STEP 4A, the juice in the dome is pushed out of the column by either gravity or air pressure at the top of the resin bed, usually with the deacidified juice exiting the column continuing to be directed to production. Then, as illustrated in STEP 4B, the outlet of the column is closed and the dome of the column is filled by introducing water, preferably from the middle-level or downcomer inlet port 30 (unless resin disturbance is not a concern), with air being vented through the top of the column. Water is introduced into the column until the dome is completely filled, at which time water flow to the column is stopped.

Next comes the "sweeten-off" phase of the process and system, as illustrated in STEP 5A, STEP 5B, and STEP 5C. First, as shown in STEP 5A, the outlet is opened and more water is introduced into the column through the top outlet port 28 so that the remainder of the deacidified juice is pushed out of the resin bed, usually going to production. This continues until the juice exiting the column no longer meets SOI criteria for the juice. In most cases, at least ¼ bed volume of juice will be recovered as product at this stage. This has been found to provide a good measure of safety to insure SOI is maintained.

Then, as shown in STEP 5B, the interface or mixture of water and juice or diluted juice is pushed out of the column by additional water entering through inlet port 28, and the diluted juice stream preferably is diverted to the secondary stream recovery tank described above. The timing of this diversion away from production is determined as generally discussed herein with respect to the "sweeten-on" phase. Typically this will be at a maximum of one bed volume of outflow.

Then, when the outflow of the diluted juice stream becomes so dilute that it is no longer economically feasible to collect, the diluted juice stream is diverted, such as to the drain, as shown in STEP 5C. The column is then taken off-line for recharging in accordance with generally known principles, at the end of which it is returned to the charged phase, typically being filled with water as in the INITIAL step of FIG. 3.

By use of this "juice dome" process and system, the juice yield has been increased approximately 10 percent, as compared to a standard method using a "water dome." Specifically, the "juice dome" facilitates control of the water-juice interface in the resin column. As a consequence, the number of Bed Volumes of liquid that are processed by the resin columns during the transitions to and from the production phase of the deacidification process is minimized, thus minimizing the dilution of the NFC or single strength juice that would otherwise be waste or be suitable only for non-NFC juice products and the like. As little as one Bed Volume of liquid is needed for the sweeten-on phase before single strength SOI criteria are reached. Less than 2 Bed Volumes of liquid are processed during sweeten-off phase before the diluted deacidified juice is no longer suitable to recover for use in non-NFC products and the like.

Further advantages accrue to the use of the deacidification process and system described above. Specifically, the introduction of the juice (or water) from the middle-level or downcomer inlet port 30 to fill the dome minimizes the potential for undesirable disturbance of the resin beads. Including the plate 31 further enhances this advantage. Introducing the juice from the top inlet port 28 during the juice processing portion of the procedure, rather than through the downcomer inlet port 30, also minimizes stagnant juice in the dome and keeps the juice that remains flowing during processing.

After the juice is deacidified as described above, it is directed to a batch tank or blend tank 14 for final mixing. Preferably, this flow is first into the recombine tank 17 where it is combined with the solids-rich flow out of the separator 16. This combined flow then enters the blend tank 14.

At least in the initial stages of deacidification when the resin column is most effective, i.e., the initial "Bed Volumes" of juice passing through the column, the acidity level of the deacidified juice may be sufficiently low—and the pH sufficiently high—that undesirable microbial activity in the deacidified juice could occur. Thus, as mentioned above and if desired, a portion of non-deacidified juice may be added back to the deacidified juice immediately upon its flow out of the resin columns in order to raise the acidity—and lower the pH—of the resulting blend to a level that discourages microbial activity. A pH of about 4.5 or below is effective for this purpose.

Figure 4A:
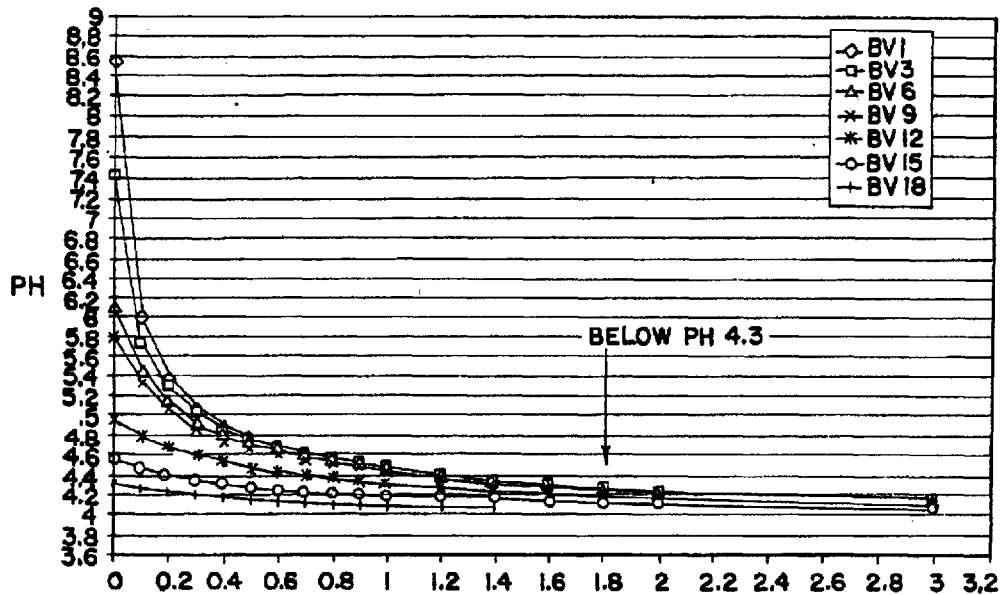
FIGS. 4A–4C are plots of pH of blended juice versus ratio of untreated juice to treated juice in the blended juice for various Bed Volumes of juice subjected to the deacidification process of the present invention, the untreated juice of this illustration having a pH of 3.94 and a titratable acidity of 0.61% for FIG. 4A, a 3.82 pH and 0.65% titratable acidity for FIG. 4B, and a 3.65 pH and 0.75% titratable acidity for FIG. 4C.
Figure 4B:
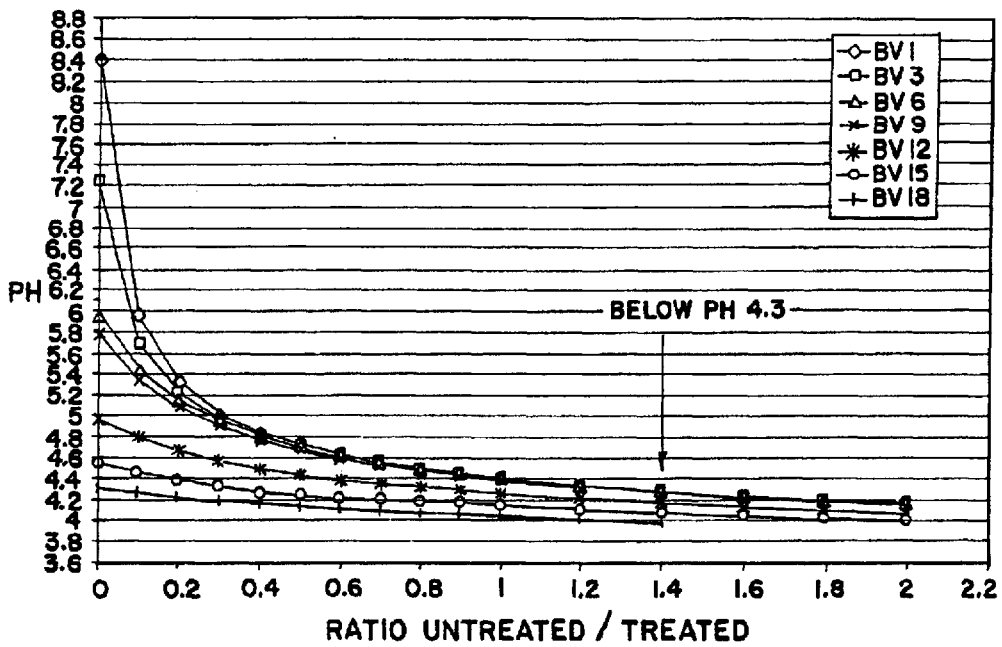
Figure 4C:
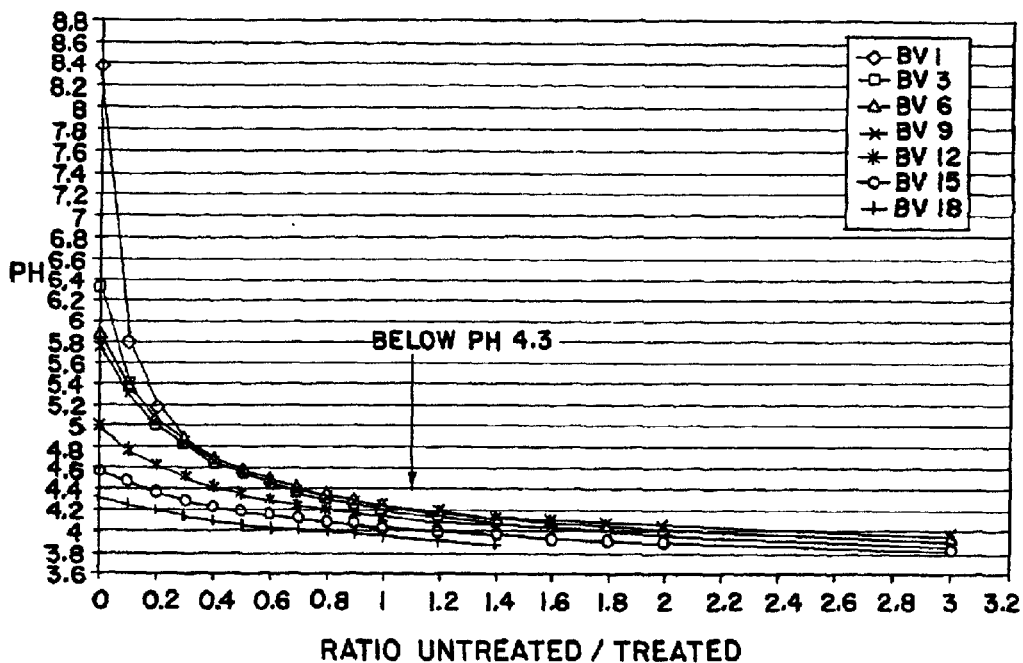

In practice, the immediate addition of untreated juice in a ratio of between about 2:1 and about 1:1 with respect to the deacidified juice may be necessary for the first 10 to 12 Bed Volumes of deacidified juice to keep the pH lower than about 4.5. See the plots of pH versus ratio of untreated juice to treated juice taken at various Bed Volumes (i.e., 1, 3, 6, 9, 12, 15 and 18) shown in FIGS. 4A, 4B and 4C, which empirically show that ratios of untreated juice to treated juice of between about 1:1 and about 2:1 should ensure a pH of 4.5 or below. Depending upon the precision of the pH measurement techniques or pH monitor, in practice it can be desirable to provide a safety cushion by targeting a lower pH, e.g., 4.4 or 4.3. After the pH of the deacidified juice exiting the resin column drops below 4.3–4.5, the immediate addition of untreated juice to raise the acidity is no longer necessary.

EXAMPLE 1

The following example illustrates the process for making low acid orange juice from NFC orange juice. The following are the parameters for the example: the titratable acidity of the NFC orange juice entering into the system at 10 is 0.68 percent, while the flow rate for the NFC feed is 133 gallons per minute (gpm). The cycle time for the process is 6 hours, resulting in a batch size of approximately 48,000 gallons. The volume of the resin in the column is 50 cubic feet, and the time required to regenerate the column is 3.5 hours.

From the inlet 10 to the system, 83 gpm of untreated juice is directly diverted to the blend tank 14. The remaining 50 gpm of untreated juice is directed to the centrifuge 12. The untreated NFC juice has the following characteristics: Temperature (35° F.); Acidity (0.68% w/w); pH (3.8); Suspended solids (11%); Oil (0.030% v/v); Ascorbic acid (40.9 mg/100 ml); and Calcium (81 ppm).

Of the 50 gpm of juice entering the centrifuge, 5 gpm is directed to the blend tank 14. Centrifuging in this example is complete if the percentage of suspended solids in the centrifuged NFC juice is less than 1 percent. After completing centrifugation, the juice has the following characteristics: Temperature (35° F.); Acidity (0.67% w/w); pH (3.8); Suspended solids (1%); Oil (0.022% v/v); Ascorbic acid (39.2 mg/100 ml); and Calcium (77 ppm).

After centrifuging, 45 gpm of juice goes directly to the resin columns 18, 20 for deacidification. However, if the centrifuged juice has not already been pasteurized, it is directed to the balance tank, from which it receives heat treatment. The juice is rapidly heated to a pasteurization temperature for a very short duration and then immediately chilled so that the product has a final temperature of 40.0° F. The pasteurized juice then is directed to the resin columns 18, 20 for deacidification.

After deacidification, in accordance with the steps described above, the deacidified juice stream exiting the resin columns has the following characteristics: Temperature (40° F.); Acidity (0–0.5% w/w); pH (9 to 4.4); Suspended solids (1%); Oil (0.018% v/v); Ascorbic acid (31.1 mg/100 ml); and Calcium (75 ppm). Note that the acidity of the juice exiting the resin column will vary so as to increase during the course of a cycle as the ion-exchange resin loses its effectiveness.

The deacidified juice is then directed to the blend tank, where it is mixed with the untreated juice to achieve the final blend having the following characteristics: Temperature (36° F.); Acidity (0.58% w/w); pH (4.1 to 4.3); Suspended solids (10%); Oil (0.028% v/v); Ascorbic acid (38 mg/100 ml); and Calcium (56 ppm). At this time, additional oils, minerals and vitamins may be added. In the present example, additional calcium is added.

The blended low acid juice then is directed at a rate of 100 gpm to a pasteurizer, or, if the untreated juice has been pasteurized, directly to a packaging line.

EXAMPLE 2

In a second example, microfiltration is used to separate the juice and solids, rather than centrifugation. Otherwise, the basic parameters are identical to those of Example 1. The titratable acidity of the NFC orange juice entering into the system is 0.74 percent; the flow rate for the NFC feed is 133 gallons per minute (gpm); the cycle time for the process is 6 hours; the batch size is 48,000 gallons; the resin bed has a volume of 50 cubic feet; and the time required the regenerate the column is 3.5 hours.

From the inlet to the system, 83 gpm of untreated juice is directly diverted to the blend tank. The remaining 50 gpm of untreated juice is subjected to microfiltration. The untreated juice has these characteristics: Temperature (35° F.); Acidity (0.74% w/w); pH (3.76); and Ascorbic acid (45.1 mg/100 ml).

Of the 50 gpm of juice being subjected to microfiltration, 10 gpm does not pass through the filter membrane and constitutes the "retentate". The retentate is directed to the blend tank. It has these characteristics: Temperature (65° F.); Acidity (0.80% w/w); pH (3.80); and Ascorbic acid (39.2 mg/100 ml).

The remaining 40 gpm that has passed through the filter membrane, i.e., the "permeate", has these characteristics: Temperature (40° F.); Acidity (0.71% w/w); pH (3.74); and Ascorbic acid (43.4 mg/100 ml).

The filtered juice goes to the resin columns at a rate of 40 gpm for deacidification in accordance with the process described above. The deacidified juice has these characteristics: Temperature (45° F.); Acidity (0.38% w/w); pH (4.22); and Ascorbic acid (38.0 mg/100 ml).

The deacidified juice is then directed to the blend tank, where it is mixed with the untreated juice and retentate to achieve the final blend having these characteristics: Temperature (35° F.); Acidity (0.61% w/w); pH (3.86); and Ascorbic acid (42.5 mg 100 ml).

Deacidified juices produced by the methods illustrated in Examples 1 and 2 were similar in flavor, and both methods yielded juices that were lower in sourness than regular orange juice which has not been deacidified.

Thus, a method for deacidifying single strength or NFC juice has been provided that meets objects of the present invention. While the invention has been described in terms of a preferred process with a specific example, there is no intent to limit the invention to the same. Instead, it is intended to be defined by the scope of the following claims.

What is claimed is:

1. A process for deacidifying not from concentrate (NFC) citrus juice using an ion-exchange column having a lower volume portion filled with acid-adsorbing resin beads and having an upper volume portion within which the resin beads are not present, the lower volume portion having an exit port, a first inlet port opening into the upper volume portion at an upper location spaced a given distance above the resin beads, a second inlet port opening into the upper volume portion at a lower location which is spaced a distance above the resin beads which is less than said given distance, the process comprising:

introducing water into the resin column;

draining a fraction of the water from the column through the exit port to create a head space in the column above the resin beads, the resin beads remaining submerged under the water;

introducing untreated citrus juice having a pre-determined brix and acidity into the resin column through the second inlet port and into the head space;

introducing untreated citrus juice into the resin column through the first inlet port;

draining water through the exit port until the brix of the outflowing treated liquid exceeds a pre-determined minimum value relative to the brix of the untreated citrus juice;

continuing to introduce untreated citrus juice through the first inlet port and directing treated liquid to production of deacidified NFC citrus juice until such time as the acidity of the treated liquid exceeds a pre-determined value;

removing treated citrus juice from the resin column so as to create a head space in the column while the resin beads remain submerged;

introducing water through the second inlet port and into the head space in the column;

introducing water through the first inlet port; and passing liquid through the exit port until the brix of the outflowing liquid drops below a pre-determined value, at which time treated liquid is no longer directed to production.

2. The process of claim 1 wherein the untreated citrus juice is introduced into the resin column through the second inlet port until the head space is filled with untreated citrus juice.

3. The process of claim 1 wherein the untreated citrus juice is introduced into the resin column through the first inlet port simultaneously with the draining of the water through the exit port.

4. The process of claim 1 wherein the outflowing liquid is first directed to production of deacidified NFC citrus juice when the brix of the liquid flowing through the exit port exceeds the pre-determined minimum value relative to the brix of the untreated citrus juice.

5. The process of claim 1 wherein the water is introduced into the resin column through the second inlet port until the head space in the column is filled.

6. The process of claim 1 wherein the water is introduced through the first inlet port simultaneously with the passing of liquid through the exit port.

7. The process of claim 1 further comprising recovering the treated liquid of the draining procedure for further processing into non-NFC juice products.

8. The process of claim 7 wherein the treated liquid is recovered for further processing when the brix of the treated liquid is less than approximately 90 percent of the brix of the untreated juice.

9. The process of claim 1 further comprising recovering the treated liquid from the passing procedure for further processing into non-NFC juice products.

10. The process of claim 9 wherein the treated liquid is recovered for further processing when the brix of the treated liquid is less than approximately 90 percent of the brix of the untreated juice.

11. The process of claim 1 wherein the treated liquid is diverted to production so long as the brix of the treated liquid exceeds approximately 90 percent of the brix of the untreated juice.

12. A process for deacidifying not from concentrate (NFC) citrus juice using an ion-exchange column having a lower volume portion filled with acid-adsorbing resin beads and having an upper volume portion within which the resin beads are not present, the lower volume portion having an exit port, the process comprising:

introducing water into the resin column;

draining a fraction of the water from the column through the exit port to create a head space in the column above the resin beads, the resin beads remaining submerged under the water;

introducing untreated citrus juice having a pre-determined brix and acidity into the resin column into the head space;

draining water through the exit port until the brix of the outflowing treated liquid exceeds a pre-determined minimum value relative to the brix of the untreated citrus juice;

continuing to introduce untreated citrus juice and directing treated liquid to production of deacidified NFC citrus juice until such time as the acidity of the treated liquid exceeds a pre-determined value;

removing treated citrus juice from the resin column so as to create a head space in the column while the resin beads remain submerged;

introducing water into the head space in the column; and passing liquid through the exit port until the brix of the outflowing liquid drops below a pre-determined value, at which time treated liquid is no longer directed to production.

13. The process of claim 12 wherein the untreated citrus juice is introduced into the resin column until the head space is filled with untreated citrus juice.

14. The process of claim 12 wherein the untreated citrus juice is introduced into the resin column simultaneously with the draining of the water through the exit port.

15. The process of claim 12 wherein the outflowing liquid is first directed to production of deacidified NFC citrus juice when the brix of the liquid flowing through the exit port exceeds the pre-determined minimum value relative to the brix of the untreated citrus juice.

16. The process of claim 12 wherein the water is introduced into the resin column until the head space in the column is filled.

17. The process of claim 12 wherein the water is introduced into the column simultaneously with the passing of liquid through the exit port.

18. The process of claim 12 further comprising recovering the treated liquids of the draining procedure for further processing into non-NFC juice products.

19. The process of claim 18 wherein the treated liquid is recovered for further processing when the brix of the treated liquid is less than approximately 90 percent of the brix of the untreated juice.

20. The process of claim 12 further comprising recovering the treated liquid from the passing procedure for further processing into non-NFC juice products.

21. The process of claim 20 wherein the treated liquid is recovered for further processing when the brix of the treated liquid is less than approximately 90 percent of the brix of the untreated juice.

22. The process of claim 12 wherein the treated liquid is diverted to production so long as the brix of the treated liquid exceeds approximately 90 percent of the brix of the untreated juice.

23. A process for making a low-acid not from concentrate citrus juice product comprising:

providing an initial citrus juice flow having sinking solids and a known brix;

diverting from the initial citrus juice flow a first portion of the citrus juice from a second portion of the citrus juice;

separating out the sinking solids from the first portion of the citrus juice to provide a solids-reduced citrus juice having not greater than about 2 volume percent sinking solids based upon the total volume of the solids-reduced citrus juice;

providing an ion-exchange column having a lower volume portion filled with acid-adsorbing resin beads and having an upper volume portion within which the resin beads are not present, the lower volume portion having an exit port, a first inlet port opening into the upper volume portion at an upper location spaced a given distance above the resin beads, and a second inlet port opening into the upper volume portion at a lower location which is spaced a distance above the resin beads which is less than said given distance;

introducing water into the resin column;

draining a fraction of the water from the column through the exit port to create a head space in the column above the resin beads, the resin beads remaining submerged under the water;

introducing the solids-reduced citrus juice into the resin column through the second inlet port and into the head space;

introducing the solids-reduced citrus juice into the resin column through the first inlet port;

draining water through the exit port until the brix of the outflowing treated liquid exceeds a pre-determined minimum value relative to the brix of the initial citrus juice flow;

continuing to introduce solids-reduced citrus juice through the first inlet port and directing treated liquid to production of deacidified NFC citrus juice until such time as the acidity of the treated liquid exceeds a pre-determined value;

removing treated citrus juice from the resin column so as to create a head space in the column while the resin beads remain submerged;

introducing water through the second inlet port and into the head space in the column;

introducing water through the first inlet port;

passing liquid through the exit port until the brix of the outflowing liquid drops below a pre-determined value, at which time treated liquid is no longer directed to production;

combining the deacidified NFC citrus juice from the ion-exchange column with said second portion of the citrus juice flow and with the separated sinking solids to achieve a final blend, which is a low-acid not from concentrate citrus juice.

24. The process of claim 23 further comprising adding a portion of the initial citrus juice flow to the deacidified citrus juice immediately after deacidification to lower the pH of the deacidified citrus juice to a value that discourages microbial activity.

25. The process of claim 23 further comprising cooling the initial citrus juice flow to a temperature of not greater than about 45° F. and maintaining the citrus juice at or below this temperature throughout the process, except during pasteurization, if same is practiced during the process.

26. The process of claim 23 wherein the separating procedure reduces the sinking solids in the solids-reduced citrus juice to less than about one volume percent, based on the total volume of the solids-reduced citrus juice.

27. A process for making a low-acid not from concentrate citrus juice product comprising:

providing an initial citrus juice flow having sinking solids and a known brix;

diverting from the initial citrus juice flow a first portion of the citrus juice from a second portion of the citrus juice;

separating out the sinking solids from the first portion of the citrus juice to provide a solids-reduced citrus juice having not greater than about 2 volume percent sinking solids based upon the total volume of the solids-reduced citrus juice;

providing an ion-exchange column having a lower volume portion filled with acid-adsorbing resin beads and having an upper volume portion within which the resin beads are not present, the lower volume portion having an exit port;

introducing water into the resin column;

draining a fraction of the water from the column through the exit port to create a head space in the column above the resin beads, the resin beads remaining submerged under the water;

introducing the solids-reduced citrus juice into the resin column into the head space;

draining water through the exit port until the brix of the outflowing treated liquid exceeds a pre-determined minimum value relative to the brix of the initial citrus juice flow;

continuing to introduce solids-reduced citrus juice and directing treated liquid to production of deacidified NFC citrus juice until such time as the acidity of the treated liquid exceeds a pre-determined value;

removing treated citrus juice from the resin column so as to create a head space in the column while the resin beads remain submerged;

introducing water into the head space in the column;

passing liquid through the exit port until the brix of the outflowing liquid drops below a pre-determined value, at which time treated liquid is no longer directed to production;

combining the deacidified NFC citrus juice from the ion-exchange column with said second portion of the citrus juice flow and with the separated sinking solids to achieve a final blend, which is a low-acid not from concentrate citrus juice.

28. The process of claim 27 further comprising adding a portion of the initial citrus juice flow to the deacidified citrus juice immediately after deacidification to lower the pH of the deacidified citrus juice to a value that discourages microbial activity.

29. The process of claim 27 further comprising cooling the initial citrus juice flow to a temperature of not greater than about 45° F. and maintaining the citrus juice at or below this temperature throughout the process, except during pasteurization, if same is practiced during the process.

30. The process of claim 27 wherein the separating procedure reduces the sinking solids in the solids-reduced citrus juice to less than about one volume percent, based on the total volume of the solids-reduced citrus juice.

* * * * *

UNITED STATES PATENT AND TRADEMARK OFFICE
CERTIFICATE OF CORRECTION

PATENT NO. : 6,730,343 B2
DATED : May 4, 2004
INVENTOR(S) : Chung et al.

It is certified that error appears in the above-identified patent and that said Letters Patent is hereby corrected as shown below:

Column 10,
Line 6, delete "the" insert -- to --.

Signed and Sealed this

Twenty-third Day of August, 2005

JON W. DUDAS
*Director of the United States Patent and Trademark Office*